(12) United States Patent
Subbarao et al.

(10) Patent No.: US 8,473,361 B2
(45) Date of Patent: Jun. 25, 2013

(54) METHOD AND SYSTEM FOR ASSISTING USERS DURING ONLINE

(75) Inventors: Murali B. Subbarao, Saratoga, CA (US); Shankar A. Chittoor, Fremont, CA (US); Allwyn B. Lobo, Campbell, CA (US)

(73) Assignee: Billeo, Inc., Santa Clara, CA (US)

( * ) Notice: Subject to any disclaimer, the term of this patent is extended or adjusted under 35 U.S.C. 154(b) by 101 days.

(21) Appl. No.: 12/888,707

(22) Filed: Sep. 23, 2010

(65) Prior Publication Data

US 2012/0078755 A1 Mar. 29, 2012

(51) Int. Cl.
*G06Q 30/00* (2012.01)

(52) U.S. Cl.
USPC .... 705/26.1; 705/27.1; 705/14.49; 705/14.51

(58) Field of Classification Search
USPC ............... 705/26, 27, 14, 26.1, 27.1, 14.1, 705/14.4, 14.49, 14.51, 14.53, 14.54
See application file for complete search history.

(56) References Cited

U.S. PATENT DOCUMENTS

| | | | |
|---|---|---|---|
| 2003/0182208 A1 | 9/2003 | Dupuis et al. | |
| 2003/0236710 A1 | 12/2003 | Tong | |
| 2004/0009813 A1 | 1/2004 | Wind | |
| 2006/0015405 A1 | 1/2006 | Bala et al. | |
| 2006/0069616 A1* | 3/2006 | Bau | 705/14 |
| 2006/0095327 A1* | 5/2006 | Vaughn et al. | 705/14 |
| 2010/0082431 A1 | 4/2010 | Ramer et al. | |

OTHER PUBLICATIONS

"Credit Cards now link to customer loyalty pograms" Blue MauMau posted by Craig Hsueh on Apr. 1, 2008.*

* cited by examiner

*Primary Examiner* — Courtney Stopp
(74) *Attorney, Agent, or Firm* — William L. Botjer

(57) ABSTRACT

A method, system, and computer program product for assisting a user in one or more activities during online shopping. The method facilitates tracking of at least one activity of the user during online shopping. Thereafter, the method identifies a suitable promotion for the user based on the tracked activity. Subsequently, the method displays the promotion in a predefined format on a portion of the browser.

44 Claims, 13 Drawing Sheets

METHOD AND SYSTEM FOR ASSISTING USERS DURING ONLINE

FIELD OF THE INVENTION

The present invention relates to online shopping. More specifically, the present invention relates to a method and system for assisting a user during online shopping.

BACKGROUND

Online shopping has become popular these days because of its ease of use and fast processing. Users can browse millions of products available on the Internet, and find out the most granular-level details about the product before buying it.

To add to the enriching experience of users buying products at the click of the mouse, various service providers such as banks, merchants, memberships, and other organizations regularly introduce various attractive offers to lure the users to shop online. For example, a merchant, such as Macys®, may offer a 10% discount on a particular type of shoes. Similarly, a particular bank, such as Bank of America®, may offer 10% cash back on a purchase from Macys using the Bank of America payment card. Yet another example of a promotion may be 4 membership rewards points for every dollar spent at Macys by American Express® card members. Additionally, the users/customers are often provided promotion codes that can be used in their subsequent purchases.

Although technology and other promotional schemes have popularized online shopping considerably, the users are not able to completely benefit from the schemes and offers available online. Card associations, issuers, and banks send via email, statements, and paper bill inserts numerous promotional codes to their customers offering cash back or discounts on purchases of products and services such as car rentals, air tickets, movie tickets, and flowers. They may also present these offers on their websites as an online shopping mall. Similarly many corporations induce loyalty to make similar promotional offers from variety of retailers via loyalty programs. The customers are benefited only if they remember receiving such promotional offers, visit the 'members only online shopping mall' website to take advantage of the offers and/or if the promotional codes are readily available with them at the time of making payments. However, often customers don't remember these offers and/of promotion codes and 'members only online shopping mall' when they are looking to buy something or when they are actually paying for a purchase at a merchant site.

Thus, in light of the discussion above, there is need for a method and system for assisting users to take an informed decision with right promotional information while shopping online. The method and system should assist the users at right moment during various stages of online shopping based on context; thereby helping them shop wisely on the Internet. The method and system should further automatically present the offers to a user that is personalized to his/her interest or membership status thereby enabling the users to get maximum benefit of the promotions/offers.

SUMMARY

Various embodiments of the invention provide a method, system, and computer program product for assisting a user with various activities while shopping online. The various activities may include, but are not limited to, searching, comparison shopping, researching product reviews and paying for a product or service. The user is pre-registered with a server, and saves one or more personal details on the server. The user interacts with the server through a browser application, which is an application embedded in the browser. Further, the server interacts with various business entities such as program sponsors (banks, card issuers, airlines, employers who sponsor 'offer malls'), mall operators (aggregate merchant offers and present them in 'offer malls' and operate them for program sponsors), affiliate networks (aggregate offers from merchants), and merchants. The server extracts various promotions associated with these business entities. The server also maintains various other shopping details associated with products/merchants.

In various embodiments of the invention, the user is authenticated with the server before initiating activities associated with online shopping. The browser application tracks the activities performed by the user on a browser and relays the tracked activities to the server. Thereafter, the server identifies at least one promotion from the server on the basis of the tracked activities, personal details and shopping details. Subsequently, the server presents the promotion to the user in a predefined format on at least one portion of the browser. The method and system also analyze the users' responses to the various promotions, and sends the analysis to the associated merchants, affiliate networks, mall operators, and program sponsors.

In various embodiments of the invention, while searching for a product/item, the user is presented with promotions/offers by tagging search results. A selected promotion/offer is remembered and carried through online shopping activity. This also includes reminding the user of the selected promotion/offer on visiting a merchant website, reminding the user to use a specific payment card to avail the promotion/offer, assisting the user to fill a specified promotion code to have an offer applied to a purchase, and saving a receipt and acknowledgment on completing a purchase.

In accordance with the present invention, the system, method, and computer program product for assisting a user in one or more activities during online shopping have numerous advantages. The method and system enable the user to get the right promotion at the right moment based on expressed shopping intent and personalized to the user (i.e. user and shopping context), without requiring the user to search for such promotions separately from the act of purchasing on a merchant website. This saves time and ensures that the user gets the most-suitable promotions on the basis of his/her preferences. The system constantly tracks various personal details associated with the user's affiliations, and updates the server at regular time intervals. Furthermore, the system displays various promotions in multiple user-friendly formats, facilitating easy access to the promotions. Also, the system analyzes the responses provided by the user corresponding to the promotions, thereby helping the merchants, banks, etc., receive feedback on their promotions.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which.

DETAILED DESCRIPTION OF THE DRAWINGS

The invention describes a method, system, and computer program product for assisting a user in one or more activities during online shopping. The method facilitates tracking of at least one activity of the user during online shopping. Thereafter, based on the tracked activity, the method identifies a suitable promotion for the user. Subsequently, the method displays the promotion to the user in a pre-defined format in a portion of the browser.

Figure 1:
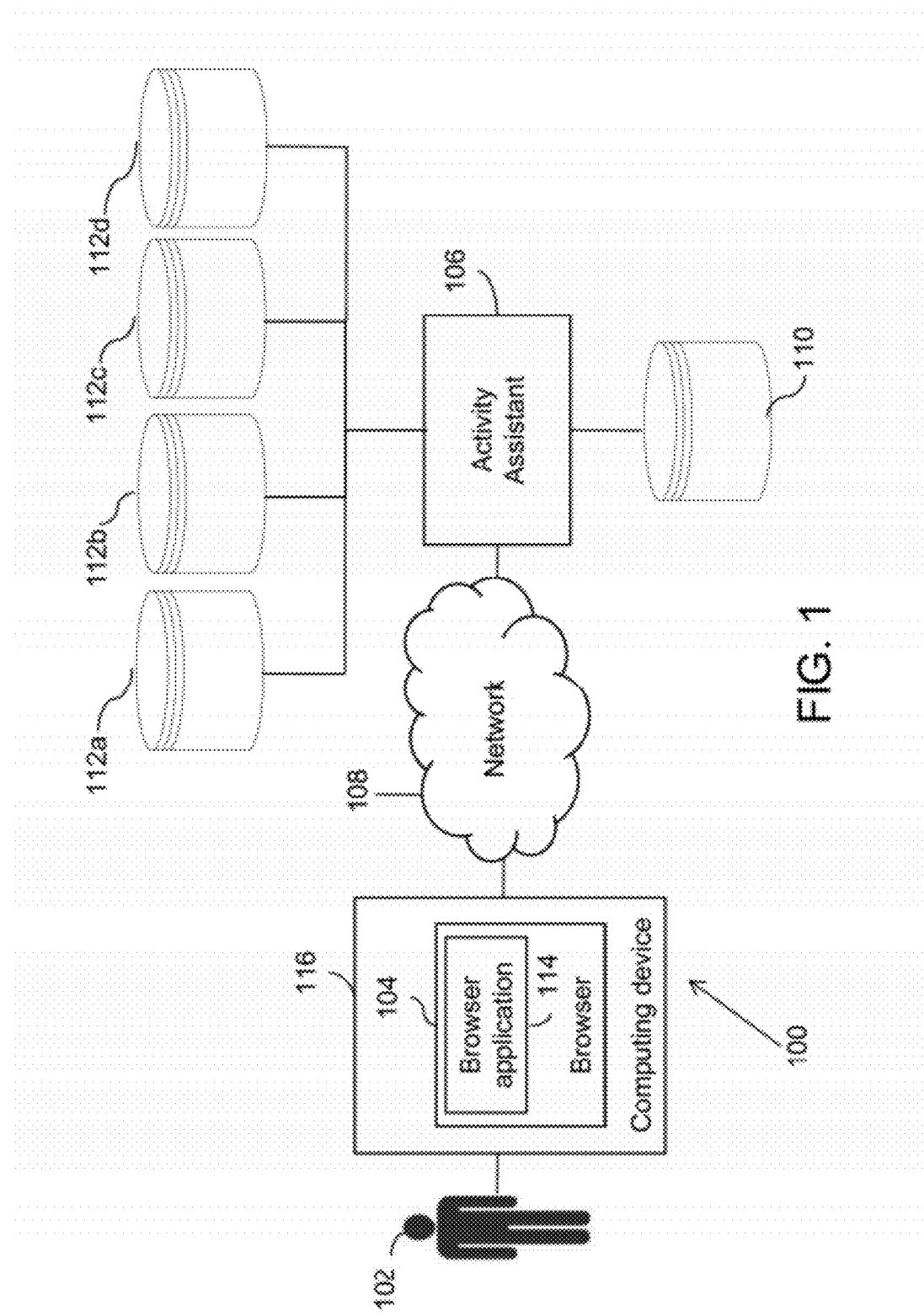
FIG. 1 is a block diagram of an environment in which various embodiments of the present invention may be practiced.
Figure 1A:
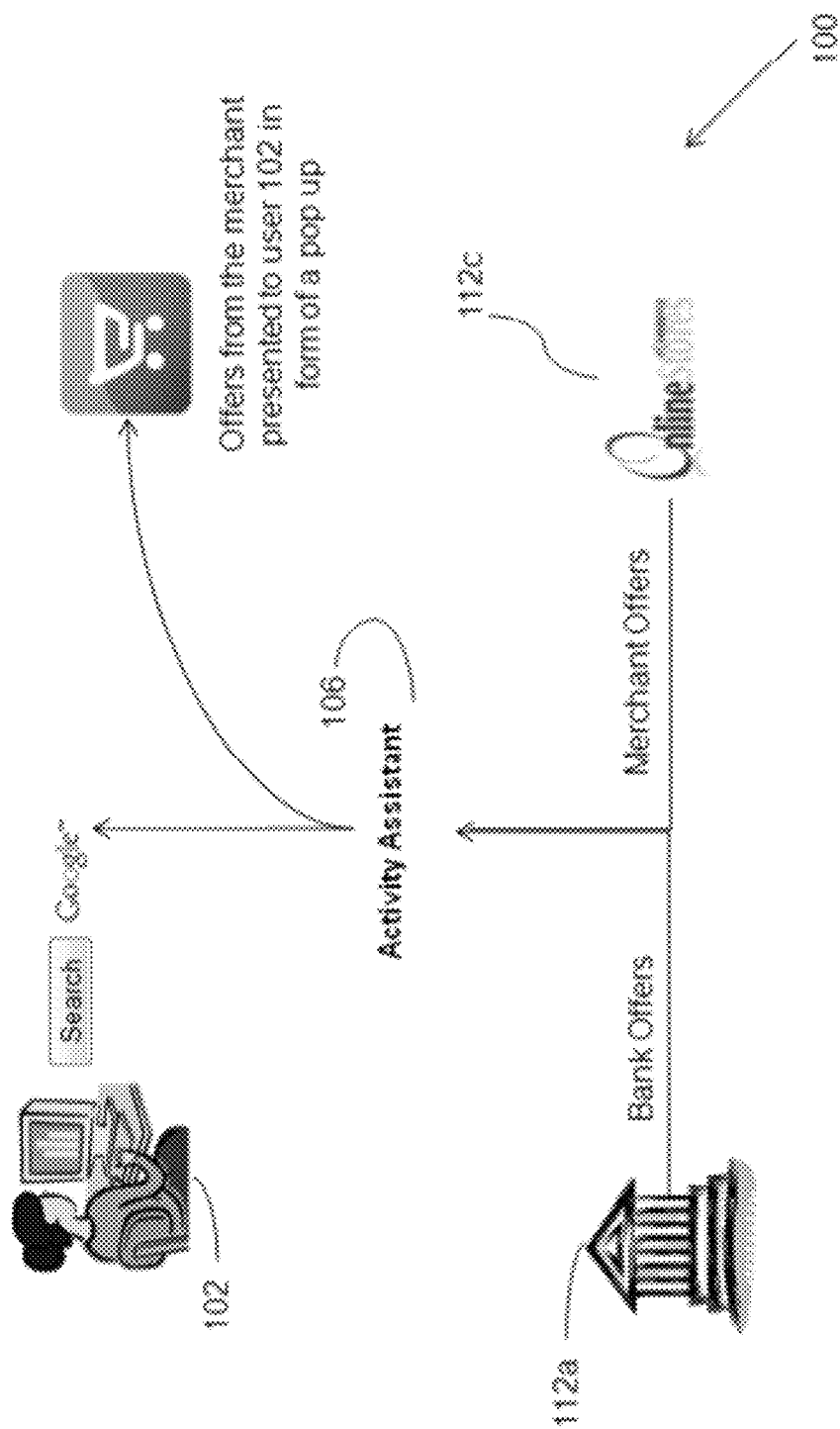
FIG. 1A is an alternative representation of the environment in which various embodiments of the invention may be practiced.

FIG. 1 is a block diagram illustrating an environment 100 in which the present invention is practiced, in accordance with an embodiment of the invention. Environment 100 may include multiple users such as a user 102; a browser 104; an activity assistant 106; a network 108; an activity assistant server 110; and one or more servers 112 such as a merchant server 112a, an affiliate network server 112b, a mall operator server 112c, and a program sponsor (loyalty programs operated by banks, airlines, bookstores, employers, etc.) server 112d. Server such as program sponsor 112d provides personal details of user 102 to activity assistant 106. Browser 104 includes a browser application 114. The browser application 114 is executing on a data processing unit 116. The data processing unit 116 may e.g. be, but is not limited to, a central processing unit (CPU), a digital signal processor (DSP), or a co-processor connected to or incorporated with a CPU or a DSP. Browser application 114 can include executable file that runs outside browser 104 in data processing unit 116. An alternative representation of environment 100 is depicted in FIG. 1A.

In various embodiments of the invention, user 102 may use browser 104 to access activity assistant 106 via browser application 114 through network 108. Examples of browser 104 may include, but are not limited to, Microsoft® Internet Explorer, Mozilla Firefox®, Apple Safari®, Google® Chrome, and Opera®. Examples of network 108 may include wired network and wireless network. User 102 may use browser 104 to shop for products online. It is well known in the art that online shopping typically includes activities such as searching for a product or service, browsing the details and reviews of the product or service, and paying for the product or the service.

In an embodiment of the invention, user 102 is registered with activity assistant 106 through browser application 114. User 102 may store one or more personal details on activity assistant server 110. Examples of personal details of user 102 may include, but are not limited to, personal credentials and preferences, and user 102's affiliations with various banks, membership programs, merchants, and organizations. User 102 may store personal credentials, such as residence address, various credit/debit card details, various membership status, contact number, and shopping history, after registering with activity assistant server 110. In another embodiment of the invention, browser application 114 stores one or more confidential information related to the user 102 such as passwords, credit card information, on a data processing unit 116 of user 102. Activity assistant server 110; and one or more servers 112 such as a merchant server 112a, an affiliate network server 112b, a mall operator server 112c, and a program sponsor (loyalty programs operated by banks, airlines, bookstores, employers, etc.) server 112d may be located remotely from user 102.

Activity assistant 106 interacts with various servers such as bank server 112a, a membership club server 112b, and a merchant server 112c. Activity assistant 106 interacts with these servers at pre-defined intervals of time to retrieve information regarding one or more offers/promotions. The information may include, but not limited to, one or more promotions and offers for merchants and products, referral URL and tracking codes, duration of applicability of the promotions/offers, terms and conditions associated with the promotions/offers, name of merchants, applicable membership levels, descriptive text about the promotions/offers and geographic applicability. In an embodiment of the invention, the pre-defined interval of time may be an hour, a day, a week, or longer. Examples of the offers/promotions may include, but are not limited to, 15% discount on the purchase of products worth USD 1,000 and 20% cash back for customers of Bank of America®, 4× membership points for customers of American Express® and the like. In an embodiment of the invention, activity assistant 106 may have various web crawlers to crawl various websites associated with the membership clubs, banks, merchants, etc., in order to retrieve various offers/promotions.

In an embodiment of the invention, activity assistant 106 may automatically receive data feeds (offers and promotions) from various servers such as 112a, 112b, and 112c. In another embodiment of the invention, administrators manually look through various offers and promotions and then sort, prioritize and annotate them. Thereafter, activity assistant 106 accordingly targets the right promotions to the right users.

Activity assistant 106 stores the retrieved promotions on activity assistant sever 110. In addition to maintaining a record of the personal details and promotions, activity assistant server 110 retrieves one or more shopping details from various servers, such as merchant server 112c, at pre-defined intervals of time. Examples of the shopping details may include, but are not limited to, one or more product reviews, demographic information and one or more affinity group associations.

In an embodiment of the invention, activity assistant 106 may retrieve personal information of user 102 from the various banks, memberships, merchants, etc. For instance, if user 102 is a member of a sports club, the activity assistant 106 will track and extract promotions pertaining to user 102 from the club' server, such server 112b. Another example may be tracking reward points accrued corresponding to a credit card of user 102. It will be apparent to any person skilled in the art that the extracted promotions will be stored on activity assistant server 110. In various embodiments of the invention, activity assistant 106 may be installed on activity assistant server 110. In another embodiment of the invention, browser application 114 may directly retrieve personal information from the servers 112a, 112b, 112c and 112d and store the information on data processing unit 116. The direct connection between browser application 114 and server's 112a-112d can ensure that no personal sensitive information is stored at activity assistant server 110.

As user 102 performs an activity on browser 104, browser application 114 tracks the activity. In an embodiment of the invention, browser application 114 tracks the activity based on the context of browser 104. The tracked activity is sent to activity assistant 106 via network 108. Examples of the context of browser 104 may include, but are not limited to, the website Uniform Resource Locator (URL), the website, the content of a webpage, a search query, the configuration of the browser, and configuration of the data processing unit, such as IP address, type of operating system, etc. facilitating online shopping.

Thereafter, activity assistant 106 targets and presents/displays via browser application 114 at least one promotion associated based on at least one context of browser 104, personal details and shopping details. As explained earlier, the promotions are stored on activity assistant server 110. Further, the promotion is displayed on browser 104 via browser application 114. In addition, while a mouse over event is performed over the promotion, details of the promotion and instructions on how to access the promotion are shown on the browser 104.

In yet another embodiment of the invention, activity assistant 106 displays at least one promotion and offer having one or more attributes of the promotion and offer. The one or more attributes include, but not limited to, specific payment card to be used with respect to the promotion, coupon code etc.

In another embodiment of the invention, while user 102 is performing a search operation on a search engine, activity assistant 106 displays via browser application 114 at least one promotion/offer by tagging the search results. That is activity assistant 106 displays via browser application 114 tags or annotates appropriate search results based on above mentioned tracking and targeting. User 102 selects a tagged search result and the selected at least one promotion/offer is remembered by browser application 114 and carried throughout an online shopping activity. For example, if user 102 performs a search operation for purchasing an item (say DVD player) on a search engine, then, based on the search results, activity assistant 106 provides via browser application 114 tagged search results including promotions/offers associated with DVD players from various merchants. Thereafter, when user 102 selects a search result having a tagged offer/promotion (say bestbuy.com result for BOSE® DVD player), browser application 114 infers on the basis of the context of browser 104, such as the website's URL, that the link belongs to a 'merchant website' (bestbuy.com). Also, browser application 114 stores information related to tagged promotion/offer in a memory. Thereafter, user 102 is reminded of the selected promotion/offer at the time of checkout at bestbuy.com with appropriate promotion/offer details.

Alternatively, when user 102 visits bestbuy.com, the promotions/offers for shopping at bestbuy.com are displayed on the website, and when the user accepts one of the promotions/offers presented, the browser application 114 stores information related to acceptance of one of the promotions/offers in a memory. Thereafter, user 102 is reminded of the selected promotion/offer at time of checkout at bestbuy.com with the selected promotion/offer details.

Figure 2:
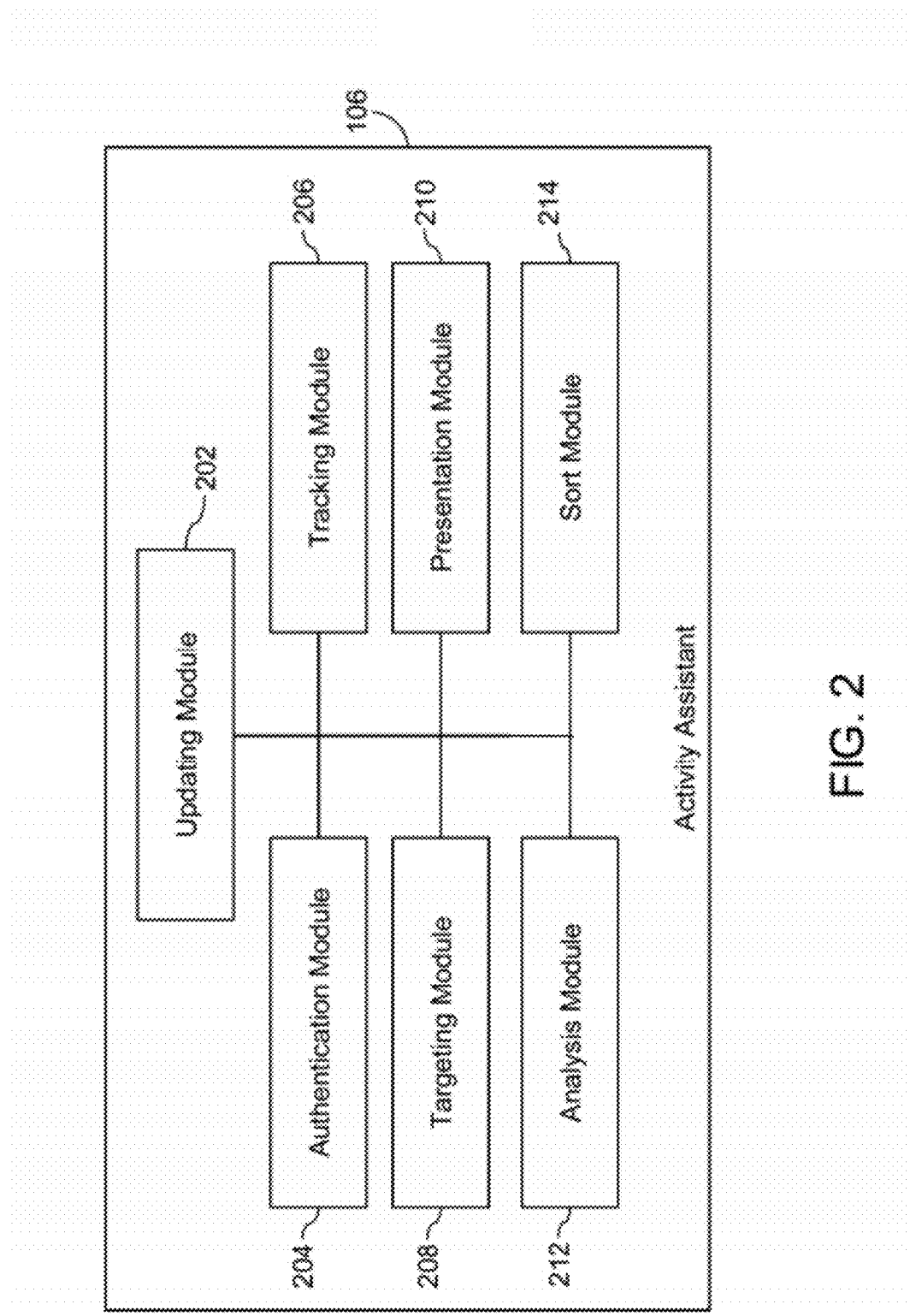
FIG. 2 is a block diagram of an activity assistant for assisting a user in one or more activities during online shopping, in accordance with an embodiment of the invention.

Further, tracking, targeting of the promotion and displaying/presentation promotions are explained in detail with the explanation of FIG. 2.

FIG. 2 is a block diagram of activity assistant 106 assisting user 102 in one or more activities during online shopping, in accordance with an embodiment of the invention.

Activity assistant 106 includes an updating module 202, an authentication module 204, a tracking module 206, a targeting module 208, a presentation module 210, an analysis module 212, and a sort module 214.

In an embodiment of the invention, updating module 202 constantly updates various shopping details, personal details associated with user 102 and various promotions by interacting with servers such as server 112a, 112b, 112c, and 112d associated with banks, memberships, and organizations. In another embodiment of the invention, the promotions specific to the registered users such as user 102, may be updated. Further, updating module 202 updates various hyperlinks and descriptions related to the promotions. In an embodiment of the invention, the hyperlinks may include merchant's website address, an authentication page for membership or bank website, and website address of the product page on a merchant website, and the descriptions may include information such as validity date of the promotion, associated business rules on how and when these promotions should be presented, discounted amount, and associated image.

To further elaborate, updating module 202 also updates personal information of user 102. For example, updating module 202 interacts with the banks related to user 102 to extract personal details such as promo code, points accrued through a credit card, membership level, jet miles, and cash back. In an embodiment of the invention, updating module 202 updates personal details such as online shopping history, frequently visited merchant websites, and reminders for upcoming bills. It is well known in the art that a user profile of user 102 may be created to store the associated personal details.

Similarly, updating module 202 extracts various shopping details such as merchant reviews, product reviews, and user ratings from various merchant websites, affiliate aggregators, mall operators or program sponsors. In various embodiments of the invention, the personal details, shopping details and promotions are stored on activity assistant sever 110. In another embodiment, some of the personal details, shopping details and promotions are stored locally at data computing device 116 of user 102.

As explained earlier, activity assistant 106 interacts with user 102 through browser application 114. Authentication module 204 authenticates user 102 with activity assistant server 110 on the basis of one or more pre-defined credentials. In an embodiment of the invention, the pre-defined credentials are entered by user 102 in browser 104 through browser application 114. It will be apparent to any person skilled in the art that the pre-defined credentials may be a user ID, password, and the like. In another embodiment, authentication of user 102 may be synchronized with server's 112a-112d. This may be implemented by using single-sign on, tokenization mechanism and the like. In yet another embodiment, authentication of user 102 may not be required and automatically promotions/offers are presented to user 102 based on tracked activities.

Once user 102 is authenticated with activity assistant server 110, browser application 114 continuously tracks at least one activity performed by user 102 on browser 104. Consequently, browser application 114 relays the at least one activity of user 102 to tracking module 206. Examples of the activities include, but are not limited to, searching for at least one of a product and a service, browsing details and reviews for at least one of a product and a service, and paying for at least one of a product and a service.

In an embodiment of the invention, the at least one activity is tracked on the basis of the context of browser 104. For example, if user 102 is searching for a product, the URL of the website, for instance, www.google.com, enables browser application 114 to infer that user 102 is 'searching' for a product and convey that to tracking module 206. Similarly, if user 102 is viewing product reviews on a comparison website, for instance, www.cnet.com, the URL of the website and content on web page, enables browser application 114 to infer that user 102 is 'evaluating' a product to purchase, and convey that to tracking module 206. Likewise if user 102 is purchasing a product, then texts such as pay and credit card on a web page enables browser application 114 to infer that user 102 is carrying out a 'payment activity'. In another embodiment of the invention, browser application 114 may also constantly track the mode of payment of user 102.

Based on the tracked activity, targeting module 208 tracks at least one promotion associated with the activity. In an embodiment of the invention, targeting module 208 targets at least one promotion based on at least one of personal details, shopping details, and context of the browser. Further, as explained earlier, activity assistant server 110 stores various promotions, shopping details, and personal details of user 102. Thus, targeting module 208 identifies the associated promotion from activity assistant server 110 based on the tracked activity. Referring again to the example above, user 102 may be a Citibank credit cardholder, and at the payment page, if an offer related to Citibank is available with activity assistant server 110, targeting module 208 may identify such a promotion to target to user 102.

In another embodiment of the invention, targeting module 208 may target informational message. For example, 'automatic extended warranty from Citibank' at a payment web page, to remind user 102 of inherent benefits of using the Citibank credit card for a purchase.

To elaborate, targeting module 208 may employ a pre-defined algorithm to identify the most relevant promotion for user 102 on the basis of at least one of personal details, shopping details, and promotion. In addition to the personal and shopping details, targeting module 208 may identify a relevant promotion on the basis of one or more rules defined by the merchants, banks, etc., for the promotions. For example, a particular promotion of American Express® may be valid for only its platinum card members. In yet another embodiment of the invention, a promotion may be targeted on the basis of the rules defined by user 102. For example, user 102 may specify that he/she does not wish to receive promotions from a particular set of merchants, brands, banks, etc. Further, it will be apparent to any person skilled in the art that targeting module 208 may identify the promotions based on various other one or more parameters associated with the personal details, promotions, and shopping details. For example, one or more parameters may include, but not limited to, loyalty programs with which user 102 is associated. Referring again to this example, here, based on the loyalty programs of user 102, promotions will be accordingly displayed to user 102.

Presentation module 210, thereafter displays the identified promotion to user 102 on at least one portion of browser 104. In various embodiments of the invention, presentation module 210 interacts with browser application 114 to display the promotion to user 102. Examples of the portion of browser 104 may include a tag, message panel, curtain, a drop-down list, a dialogue box, a tool bar, a sidebar, and any other available space on browser 104. Further, presentation module 210 displays the promotion in a pre-defined format. Examples of the pre-defined format may include tagging a search result, highlighting the promotion with a border, and indicating the promotion with an icon such as an arrow. In various embodiments of the invention, presentation module 210 interacts with tracking module 206 to display the promotion on browser 104.

Analysis module 212 analyzes the behavior of various users, such as user 102, corresponding to the promotions based on the responses provided by user 102. It will be apparent to any person skilled in the art that the responses of user 102 are determined by the mouse-over's, click outs, checkouts and purchases made by user 102 in browser 104. Analysis module 212 also sends the analysis of the responses in the form of reports to the corresponding banks, merchants, etc. For example, Citibank may be offering a promotion "2× points for any purchase during a month." Thus, the analysis carried out on various parameters, such as the number of people that have shown interest in the promotion or actually purchased a product or service using the promotion, may be sent to Citibank for the bank's further analysis. Another parameter for the analysis may be users from a particular geographical area who have shown interest in a particular promotion. It will be apparent to any person skilled in the art that there may be various other forms of analysis that may be performed based on the responses provided by the users.

Further, functioning of the modules described above and other modules of activity assistant 106 has been further explained in detail in conjunction with various activities performed by user 102 on browser 104 while shopping online.

Exemplary Activity: 'Searching' for a Product or Service

Example 1

Figure 3:
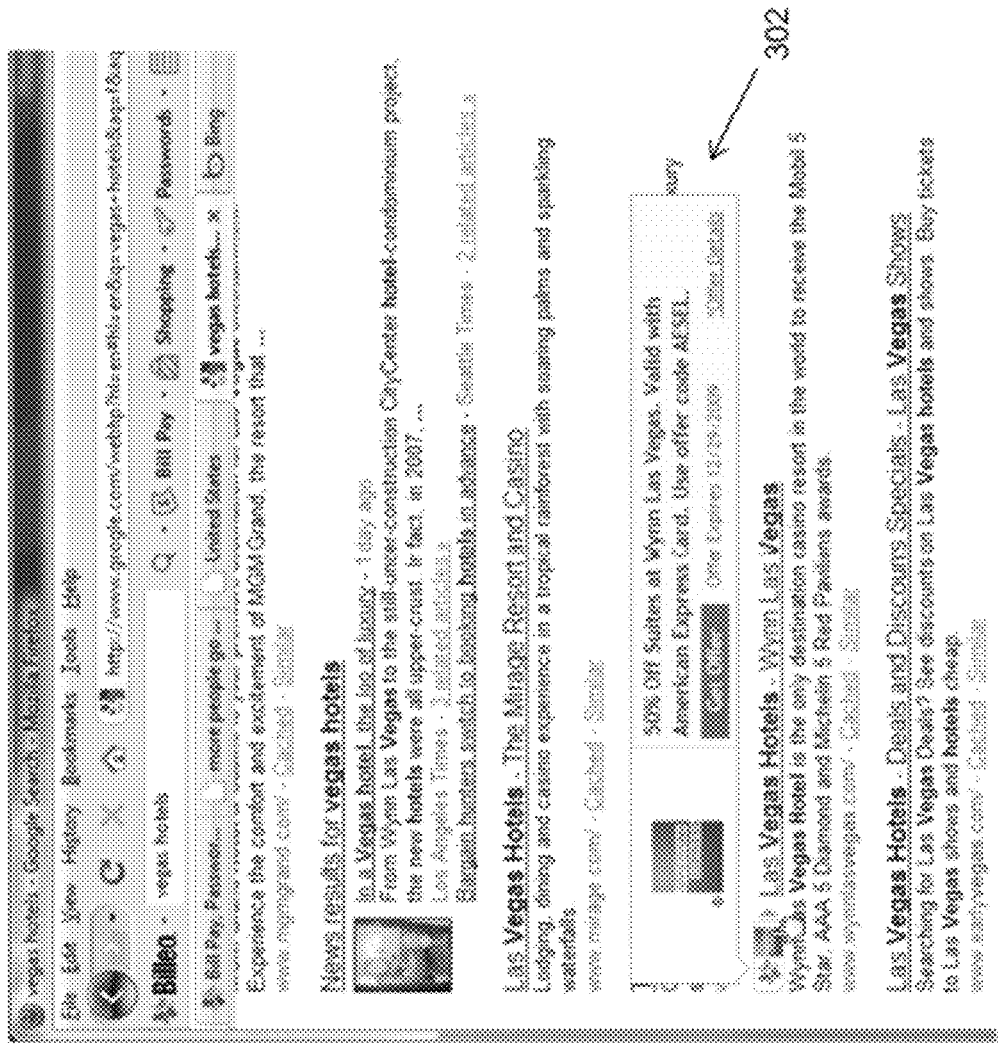
FIG. 3 is an exemplary screenshot depicting the assistance provided to the user, in accordance with an embodiment of the invention.

User A, such as user 102, may be searching for a product or service on the Internet as shown in FIG. 3. Further, user A is pre-registered with activity assistant 106. Thus, personal details of user A, such as card details, personal preferences, browsing history, and affiliations with various banks, are saved on activity assistant server 110. Furthermore, updating module 202 updates activity assistant server 110 with various promotions associated with various banks, merchants, membership clubs, etc. Further, updating module 202 may update personal details of user A, such as reward points earned so far from a card issuer, jet miles, any promotion code relating to a card issuer that user A may use in the next purchase, and offers that are specific to user A from affiliated memberships, merchants, and banks. In the current example, user A is a credit card member, such as "American Express" (Amex). Thus, it will be apparent based on the description above that updating module 202 will update the promotions relating to the Amex membership.

Returning to the 'search activity,' user A may be searching for a hotel in Las Vegas on the Internet. It is well known in the art that user A may access any search engine, such as Google, and enter a keyword-based search query, for example, 'Vegas Hotels,' to search for a suitable match. Based on the URL of the website, browser application 114 tracks that user A is performing a search activity and relays the tracked activity to activity assistant 106. Thereafter, the search results identified by the search engine based on the keyword-based search query are used by targeting module 208 to identify any corresponding readily available promotions stored on activity assistant server 110.

In an exemplary embodiment of the invention, targeting module 208 identifies the promotion on the basis of the user's affiliation with a club. Thereafter, presentation module 210 annotates the search results with an icon and displays the promotion to user A. Referring again to the example above, since user A is an American Express card member, user A is entitled to a 50% discount when he/she books a hotel suite at Wynn Hotels in Las Vegas. Thus, the 'Wynn Hotels' result is annotated for user A; thus providing assistance during online shopping. An exemplary screenshot in FIG. 3 depicts the presentation of the promotion associated with American Express to user A. Further, as depicted, the result is shown by arrow 302 to assist user A.

Example 2

Figure 4:
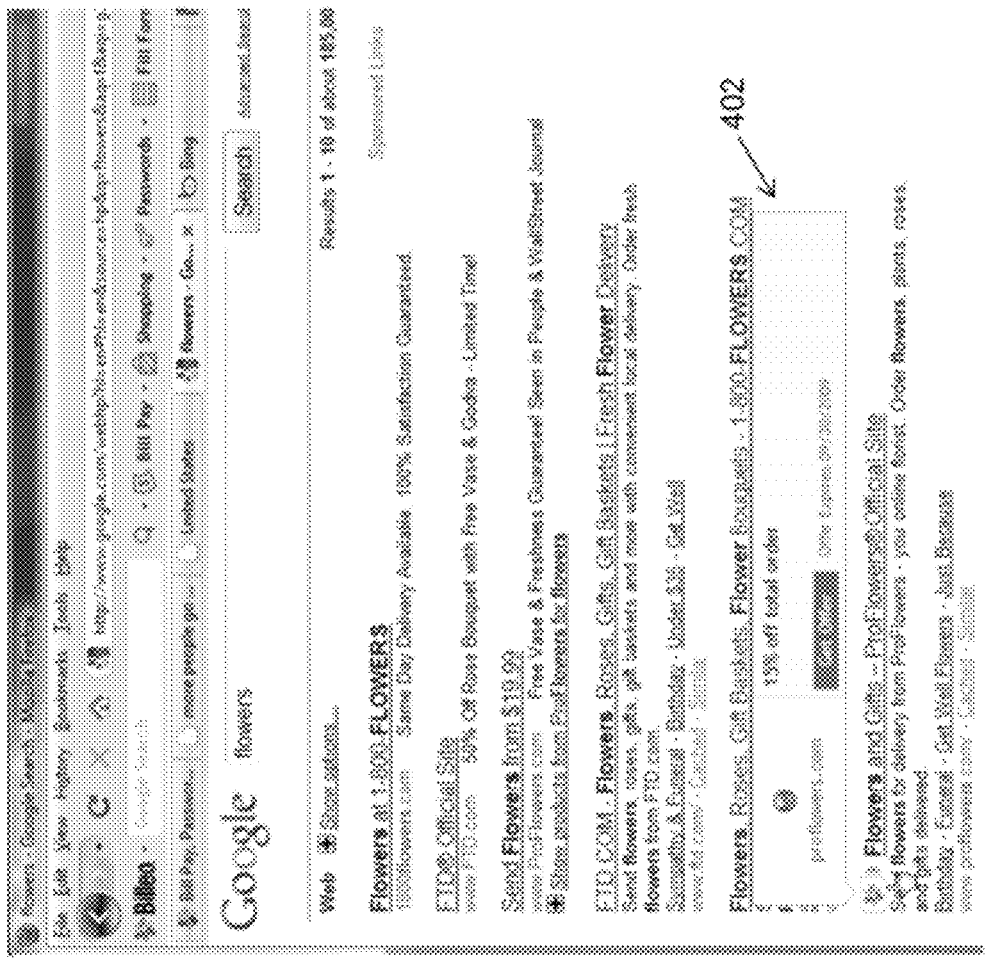
FIG. 4 is an exemplary screenshot depicting the assistance provided to the user, in accordance with an embodiment of the invention.

User B, such as user 102, may search for flowers on the Internet. Based on his/her previous purchases of flowers at merchant site 1800flowers.com, a promotion may be offered by proFlowers.com for user B on his/her next purchase of flowers as shown in FIG. 4. For example, "15% off on total purchase order". It will be apparent to any person skilled in the art that since user B is registered with activity assistant 106, updating module 202 updates activity assistant server 110 with relevant offers relating to user B. Thus, when the search engine identifies various merchant websites selling flowers on the Internet, targeting module 208 simultaneously checks for the associated promotions stored on activity assistant server 110. Targeting module 208 then targets the merchant website proFlowers.com and prompts user B to use the promotion on the website (as depicted in FIG. 4 by arrow 402). Further, proFlowers.com may be further selected across multiple merchant websites, such as merchant rating sites, based on one or more rules defined by user B, bank, or merchant.

Figure 5:
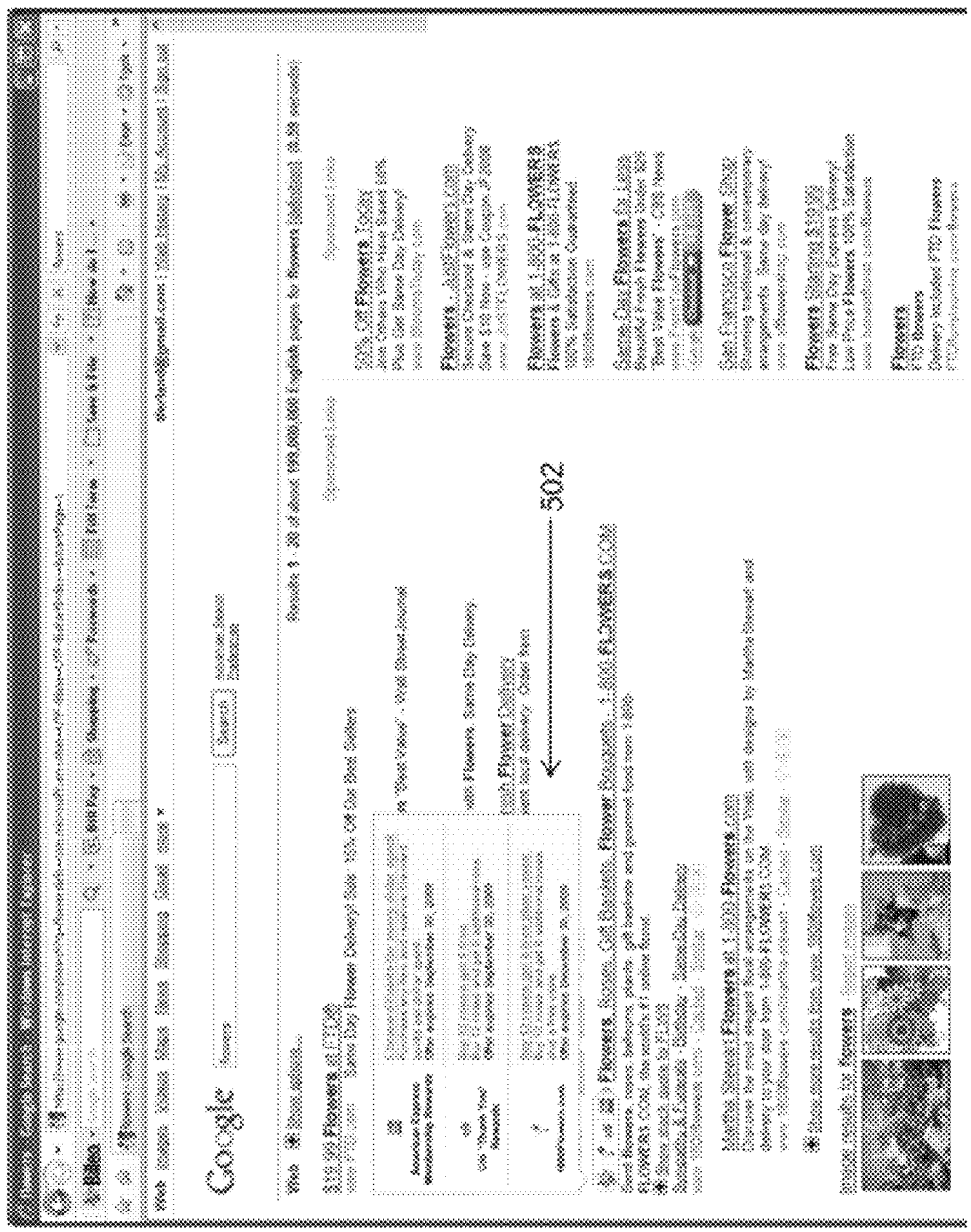
FIG. 5 is an exemplary screenshot depicting the assistance provided to the user, in accordance with an embodiment of the invention.

In another exemplary embodiment of the invention, presentation module 210 may thereafter present more than one promotion associated with a merchant. For example, as depicted in FIG. 5 by arrow 502, promotions from Citibank, American Express, and the 1-800-Flowers are presented simultaneously to user B. It will be apparent to any person skilled in the art that targeting module 208 may identify multiple promotions associated with the search results based on at least one of the personal details and shopping details of user B.

In yet another exemplary embodiment of the invention, sort module 214 of activity assistant 106 may sort the results identified by the search engine based on the user preferences, personal details, etc. Thereafter, presentation module 210 may accordingly present the search results to user 102. For example, sort module 214 may scan the multiple offers shown at different places in the search results page and present them together for user 102. Similarly, sort module 214 may sort only 'cash back' offers in the search results for user 102. Presentation module 210 may also tag the result with a message, for example, 'Use your American Express® reward points while purchasing at the following merchants.' It will be apparent to any person skilled in the art that there may be various other parameters associated with the personal details, the promotion, and shopping details based on which the result may be sorted and presented to user 102.

Exemplary Activity: 'Browsing' for a Product or Service

It is well known in the art that user 102 may wish to visit the merchant website to purchase a product after the search results have been presented to him/her. Interactions of various modules of activity assistant 106 to facilitate assistance while browsing for a product have been explained in conjunction with an example for the sake of clarity.

Example 1

Figure 6:
FIG. 6 is an exemplary screenshot depicting the assistance provided to the user, in accordance with an embodiment of the invention.

User C, such as user 102, may wish to browse a merchant website, for example, www.bestbuy.com as shown in FIG. 6. Further, as explained earlier, updating module 202 updates activity assistant server 110 with various promotions available across merchant websites. The activity assistant 106 reminds user 102 about a promotion for which user 102 is eligible. For example, user is eligible for point acceleration, that is, on purchase of any next item, three times of the points will be earned for each dollar spent at www.bestbuy.com for a specific period. An exemplary screenshot depicting such a pop-up is depicted by arrow 602 in FIG. 6.

Example 2

User C, such as user 102, may wish to browse a merchant website, for example, www.hdtvs.com, to select a HDTV of his/her choice. Further, as explained earlier, updating module 202 updates activity assistant server 110 with various promotions available across merchant websites. Further, since activity assistant server 110 maintains the personal preferences of user C, targeting module 208 identifies a promotion that may be matching user's preference. For example, user C has specified his/her personal preference for the Panasonic® brand with activity assistant server 110. Accordingly, targeting module 208 identifies a promotion that may be associated with Panasonic® at www.panasonic.com. Thereafter, presentation module 210 presents the promotion relating at www-.panasonic.com to user C in the form of a pop-up. In another embodiment of the invention, the pop-up may be for a different merchant. In an embodiment of the invention, the pop-up presented to user C may be from the same merchant, i.e., the merchant www.hdtvs.com user C is currently browsing.

Exemplary Activity: 'Paving' for a Product or a Service

It is well known in the art that user 102 has to pay for the product once he/she decides to purchase a particular product on a merchant website. Thus, targeting module 208 and presentation module 210 together identify and present a suitable promotion respectively to user 102 at the time of payment for a product/service. This is further explained with the help of examples below.

Example 1

Figure 7:
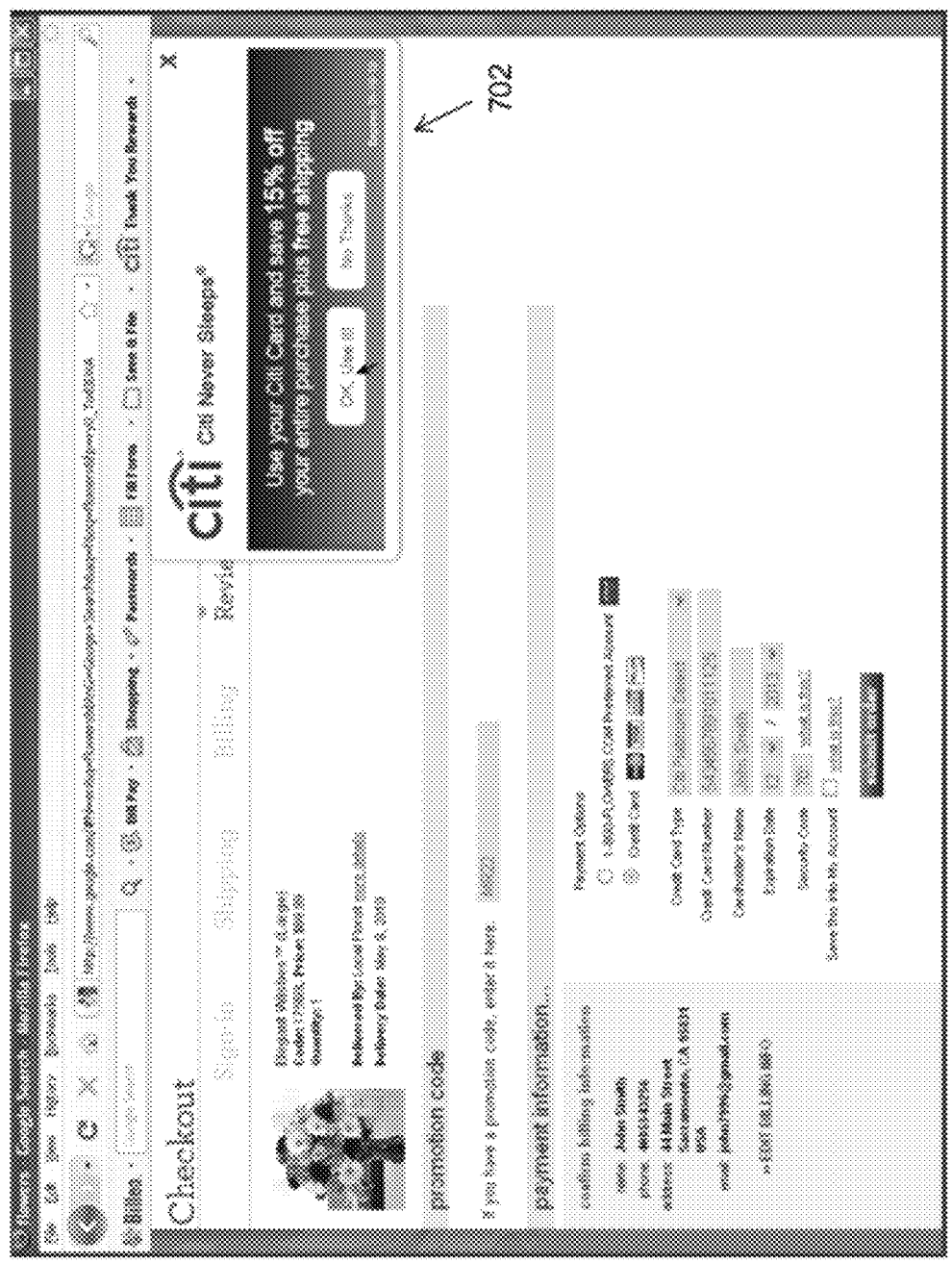
FIG. 7 is an exemplary screenshot depicting the assistance provided to the user, in accordance with an embodiment of the invention.

User C may have credit cards from various banks such as Bank of America (BoA) VISA® Card, Citibank Master Card®, and American Express®. Accordingly, at the time of payment, targeting module 208 will identify various offers of the affiliated banks of user C. Subsequently, presentation module 210 may prompt user C to use the card that is tied with a promotion previously selected by the user. For the sake of clarity, it is depicted in FIG. 7 that a pop-up is shown to the user to use Citibank MasterCard® card to purchase the product.

Additionally, in situations where no offer is available for purchasing an item, then, targeting module 208 can enable preference settings to feature use of a particular brand of payment card at checkout. For example, in case user C plans to rent a car from a merchant website and currently, no offer is valid. In that case, targeting module 208 checks the various credit cards and brand of credit cards (e.g. Gold, Platinum etc.) available with user C and accordingly targeting module 208 provides the card brand with auto-insurance protection to user C.

Example 2

User C may be entitled to purchase a product using already accrued reward points. In a search result user C is presented with information on available points, and how to redeem points to purchase the product at program sponsor's website. Accordingly, on the payment page/check out page, targeting module 208 automatically retrieves the reward points of user C and presentation module 210 prompts user C to use his/her accrued reward points.

In various embodiments of the invention, the modules of activity assistant 106, such as updating module 202, authentication module 204, tracking module 206, targeting module 208, presentation module 210, analysis module 212, and sort module 214 may be implemented in the form of software, hardware, firmware, or combinations thereof. The modules of activity assistant 106 are located at activity assistant server 110.

Figure 8:
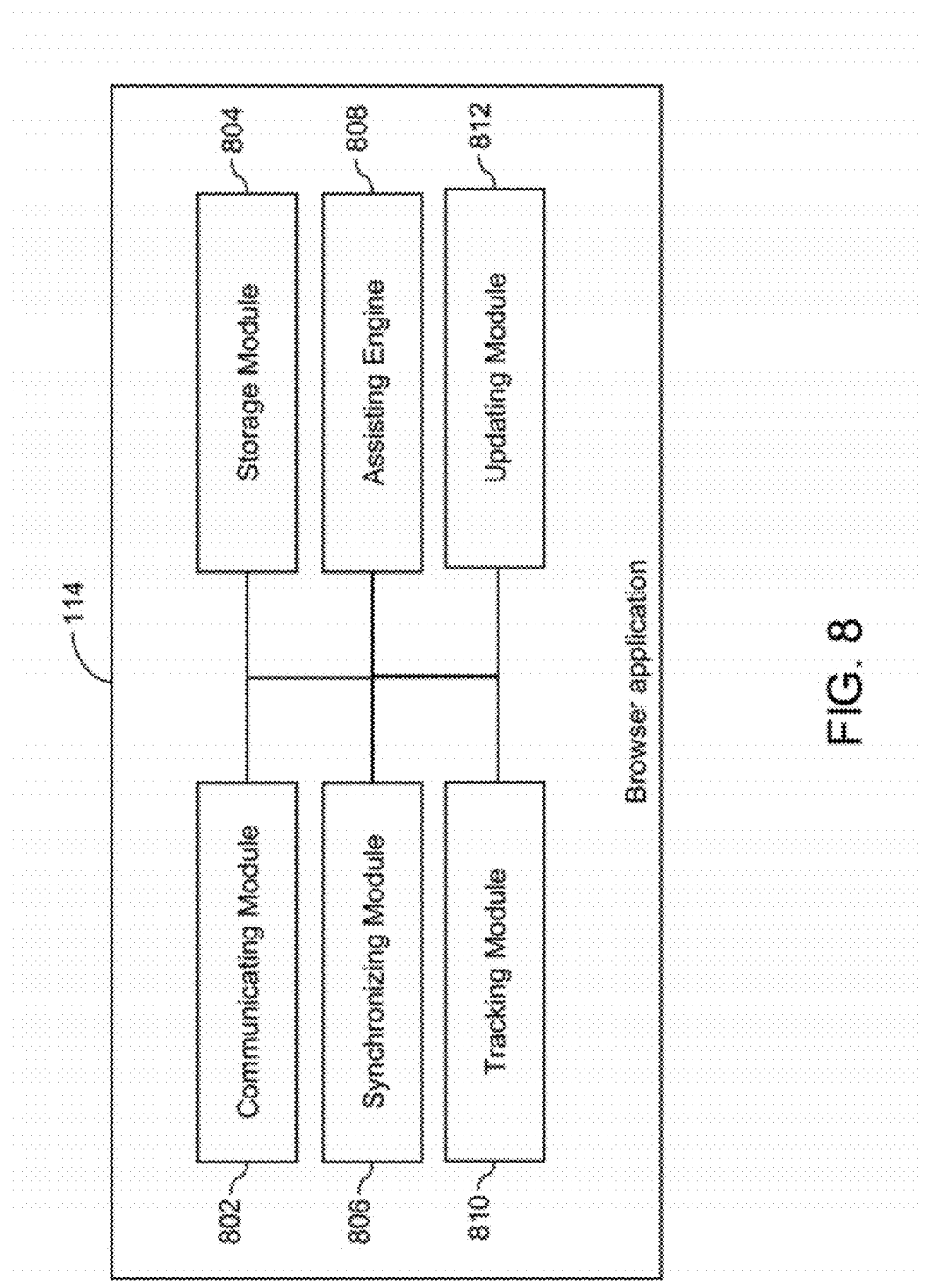
FIG. 8 is a block diagram of a browser application at the user's end, in accordance with an embodiment of the invention.

FIG. 8 is a block diagram depicting browser application 114 at the user 102 end, in accordance with an embodiment of the invention.

Browser application 114 includes a communicating module 802, a storage module 804, a synchronizing module 806, an assisting engine 808, tracking module 810 and updating module 812.

In various embodiments of the invention, browser application 114 is installed on the data processing unit 116 of user 102. As explained earlier, browser application 114 constantly interacts with activity assistant 106 to help user 102 for online shopping. In an embodiment of the invention, browser application 114 may be downloaded from a website, for example, Billeo®. It will be apparent to any person skilled in the art that browser application 114 and activity assistant 106 perform a client-server interaction.

Communicating module 802 communicates with activity assistant 106 during online shopping. Further, communicating module 802 receives the credential details from user 102, and sends the details to activity assistant 106 to authenticate user 102. Communicating module 802 constantly interacts with activity assistant 106 to extract the personal details associated with user 102 from activity assistant server 110. Examples of the personal details include, but are not limited to, accrued reward points based on the card usage of user 102 and updated balance of the affiliated bank of user 102. These personal details may be later used at the time of filling various forms, such as 'check out' webpage.

Storage module 804 stores the confidential details of user 102 in the local memory of data processing unit 116. Storage module 804 also stores one or more preferences and configuration of data processing unit 116 of user 102. In another embodiment of the invention, any other personal information may also be stored locally on data processing unit 116. In another embodiment, such data may be transferred across the network 108 and stored in activity assistant server 110.

Synchronizing module 806 synchronizes between data processing unit 116 of user 102 and browser 104. Synchronizer module 806 also synchronizes interactions across multiple browsers. The synchronization can extend to sessions across different computers. For example, User 102 may have different browsers (e.g. Internet Explorer and Firefox) running on same data processing unit. On authentication, browser application 114 can be enabled for both browsers. The synchronizing module 806 ensures that settings, preferences, etc. are applied in same way on both browser brands. Similarly, browser application 114 for different users on different machines can synchronize. For example, when group buying is involved, status of purchases done by community at large is kept up-to-date on all the user's browsers using synchronizing module 806.

Assisting engine 808 automatically fills in one or more personal details such as credit card information and residence address of user 102 on the payment page. In an embodiment of the invention, assisting engine 808 may retrieve personal details from storage module 804 in order to fill the form on the payment page. In another embodiment of the invention, assisting engine 808 may retrieve data from activity assistant server 110 to fill personal details on the payment page.

Figure 9:
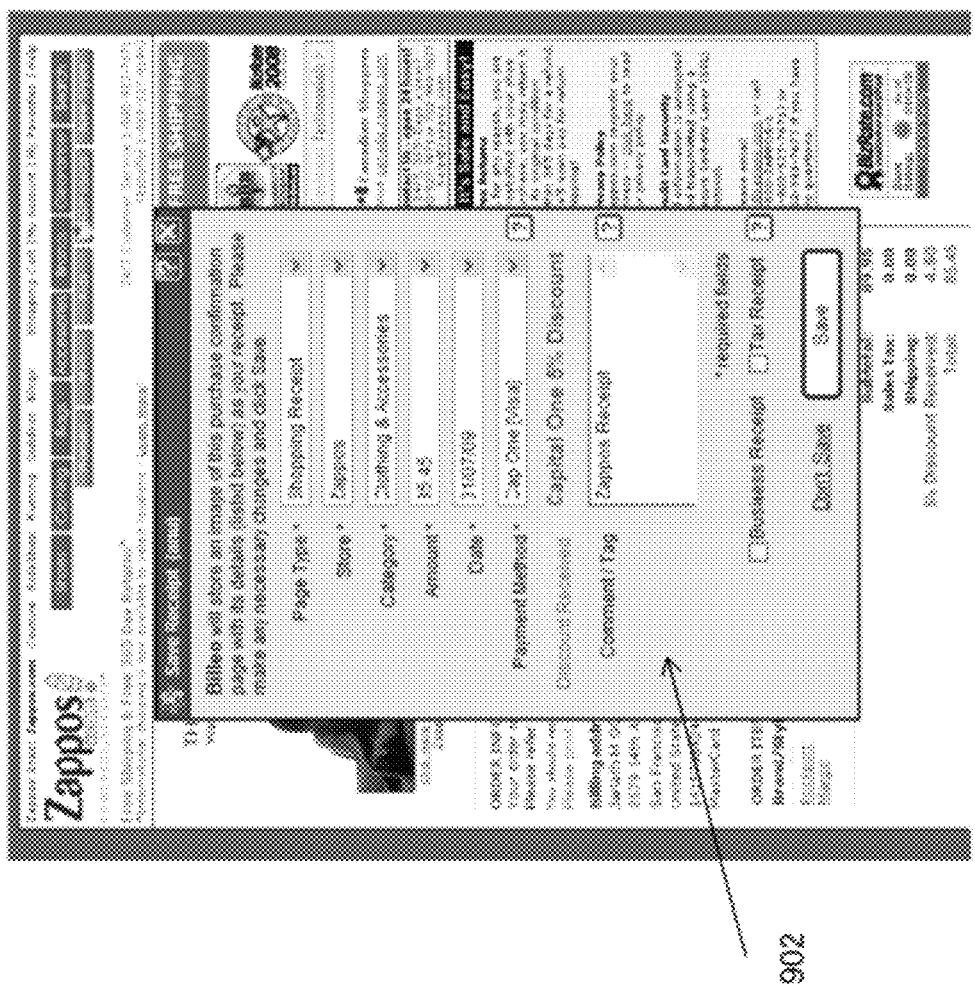
FIG. 9 is an exemplary screenshot depicting the assistance provided to the user, in accordance with an embodiment of the invention.

Assisting engine 808 enables the user to store one or more transaction reports/receipts associated with the payment/transaction. In an embodiment of the invention, the discount received from the bank/merchant during the purchase by user 102 is highlighted in the transaction report. In an embodiment of the invention, user 102 may store the report in the local memory of the data processing unit. In another embodiment of the invention, user 102 may save the report on activity assistant server 110. An exemplary report generated by report module 216 is depicted in FIG. 9, and the highlighted discounted price is depicted by arrow 902.

Assisting engine 808 interacts with activity assistant 106 to overlay the promotions on the web page. In an embodiment of the invention, assisting engine 808 interacts with presentation module 210 to overlay the promotion on browser 104.

Tracking module 810 tracks at least one activity of user 102 and accordingly relays the information about activity to activity assistant 106.

Updating module 812 retrieves personal details of user 102 from servers' 112*a*-112*d* and stores information in storage module 804. This activity avoids storing any personal detail at activity server 110. Examples of the personal details include, but are not limited to, accrued reward points based on the card usage of user 102 and updated balance of the affiliated bank of user 102. These personal details may be later used at the time of filling various forms, such as 'check out' webpage.

In various embodiments of the invention, the modules of browser application 114, such as communicating module 802, storage module 804, synchronizing module 806, assisting engine 808, tracking module 810, and updating module 812 may be implemented in the form of software, hardware, firmware, or combinations thereof.

Figure 10:
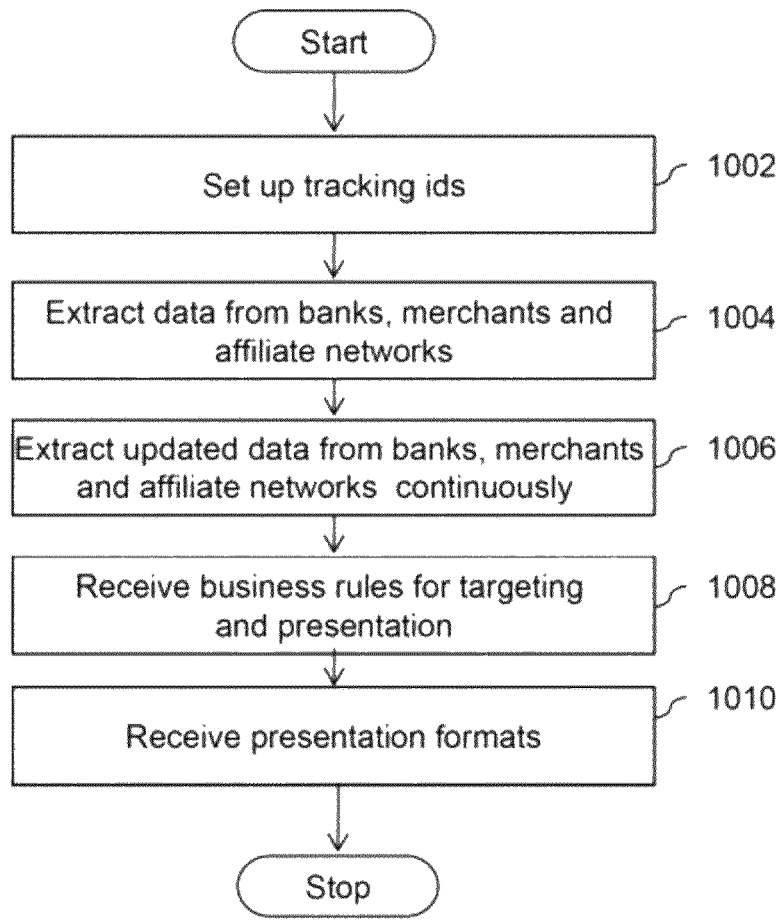
FIG. 10 is a flowchart depicting a method for creating a database in a server, in accordance with an embodiment of the invention.

FIG. 10 is flowchart depicting a method for creating a database on a server such as activity assistant server 110, in accordance with an embodiment of the invention.

In various embodiments of the invention, a server, such as activity assistant server 110, interacts with various business entities to create a database of various promotions. Various business entities may be banks, membership clubs, merchants, and other organizations that constantly offer online promotions for users. Further, the interaction of the server with the various business entities is explained below in detail.

At 1002, server 110 using activity assistant 106 set-ups tracking ids with one or more program sponsors for 'offer stream' and 'specific offers' for measuring performance and tracking results.

At 1004, server 110 using activity assistant 106 interacts with one or more program sponsors, various merchants and affiliate networks to extract promotions. In an embodiment of the invention, activity assistant 106 may have various web crawlers to crawl websites associated with various program sponsors to extract promotions for the users, such as user 102. In an embodiment of the invention, activity assistant 106 may extract various promotions that may be applicable to all users who are registered with the corresponding program sponsor. It will be apparent to any person skilled in the art that the server may interact with various other membership organizations such as air travel websites to extract various promotions.

At 1006, activity assistant 106 recursively interacts with one or more program sponsors, various merchants and affiliate networks to extract updated promotions.

At 1008, activity assistant 106 interacts with program sponsors for receiving business rules for targeting and presentation.

At 1010, activity assistant 106 interacts with program sponsors for receiving presentation formats of promotions.

In an embodiment of the invention, the server may maintain a database by creating tables associated with each user. The table may include various details such as shopping and personal details related to the users. Further, another table may include various details/rules associated with the promotions. It will be apparent that the database may be maintained based on any other suitable data structure.

Thus, a comprehensive database maintained on the server provides the most-suitable promotions to the user, and thus facilitates effective online shopping.

Figure 11:
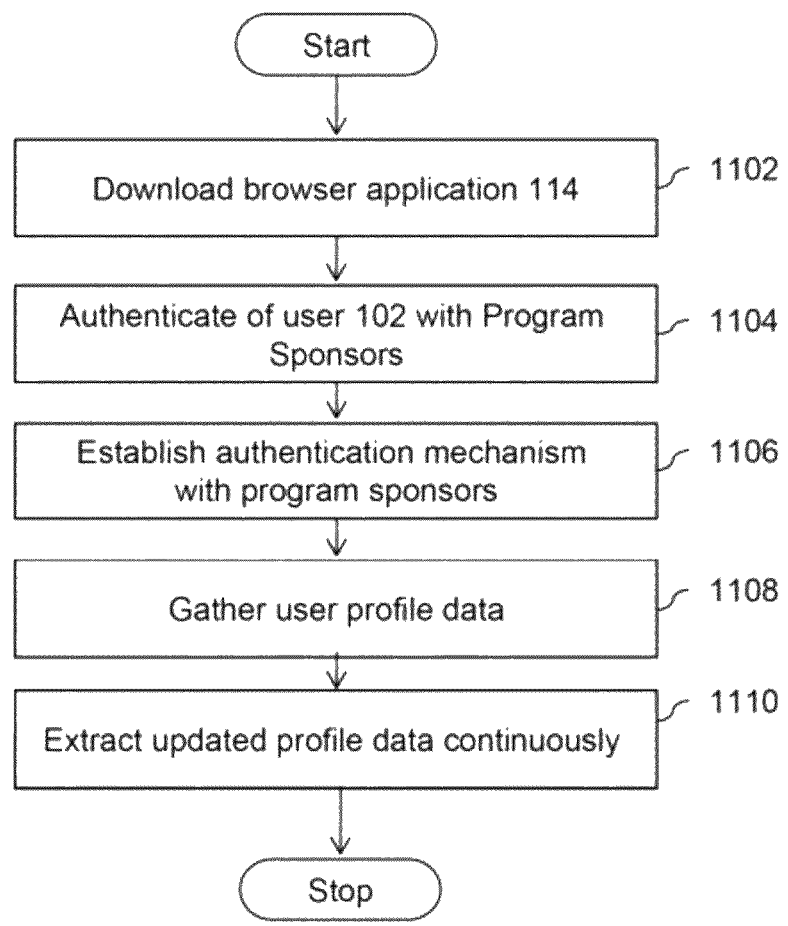
FIG. 11 is a flowchart depicting a method for creating a database in a server, in accordance with an embodiment of the invention.

FIG. 11 is flowchart depicting a method for creating a database on a server such as activity assistant server 110, in accordance with an embodiment of the invention.

In various embodiments of the invention, a server, such as activity assistant server 110, interacts with various business entities and browser application 114 to create a database that maintains user profiles. Various business entities may be banks, membership clubs, merchants, and other organizations that constantly offer online promotions for users. Further, the interaction of the server with the various business entities and browser application 114 is explained below in detail.

At 1102, user 102 downloads browser application 114 from either server 110 or the business entities.

At 1104, user 102 is authenticated with one or more program sponsors, various merchants and affiliate networks by using browser application 114 and/or activity assistant 116.

At 1106, an authentication mechanism with one or more program sponsors is established.

At 1108, activity assistant 106 gathers user profile data that includes, but not limited to, card details, address details, membership details, and membership status.

At 1110, activity assistant 106 recursively interacts with one or more program sponsors, various merchants, affiliate networks and user 102 to extract updated data using the authentication mechanism.

In an embodiment of the invention, the server may maintain a database by creating tables associated with each user. It will be apparent that the database may be maintained based on any other suitable data structure.

Thus, a comprehensive database maintains updated user profile data on the server and thus facilitates effective online shopping.

Figure 12:
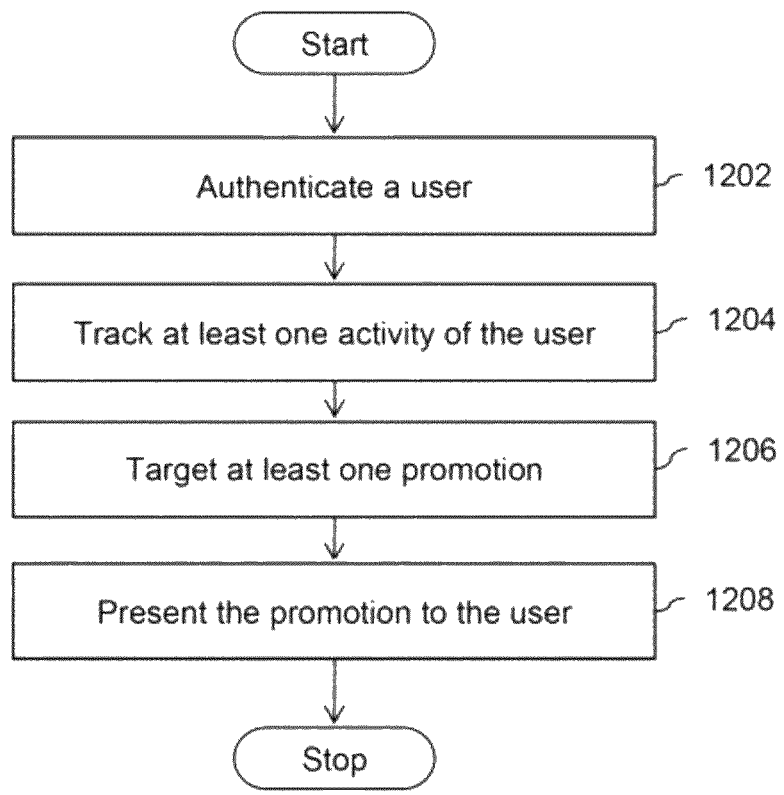
FIG. 12 is flowchart depicting a method for assisting a user in one or more activities during online shopping, in accordance with an embodiment of the invention.

FIG. 12 is flowchart depicting a method for assisting a user in one or more activities during online shopping, in accordance with an embodiment of the invention.

In various embodiments of the invention, the user is registered with the server. The user accesses the server through a browser application, such as browser application 114, embedded in a browser such as browser 104. In an embodiment of the invention, the user may register with the server by providing one or more personal details such as name, residence address, and contact number. Once registered, the user may access the server to obtain assistance for online shopping.

At 1202, a request for accessing the server is received. Thereafter, the server authenticates the user based on the personal credentials provided by the user. The authentication of the user has been explained in detail in conjunction with FIG. 2. In another embodiment of the invention, no user authentication is required.

After authentication, at 1204, the browser application 114 tracks the activities performed by the user on the browser and relay the tracked activities to activity assistant 106 via network 108. Examples of the activities associated with online shopping may be searching for a product or service, browsing for a product or service, and paying for a product or service. In an embodiment of the invention, the browser application 114 tracks the activities of the user based on a context of the browser. Further, tracking of the activity performed by the user has been explained in detail in conjunction with FIG. 2. Thereafter, at 1206, the server identifies at least one promotion for the user. In various embodiments of the invention, the server identifies a promotion suitable to the user based on at least one of the personal details, shopping details, and context of the browser. Subsequently, at 1208, the server displays/presents the promotions identified by the server in at least one predefined format on a portion of the browser. In an embodiment of the invention, the presentation of the promotion is performed in synchronization with the browser application 114. Further, tracking of activities, targeting and presentation of the promotion have been explained in detail in conjunction with FIG. 2.

In another embodiment of the invention, the server analyzes the responses of various users corresponding to the promotions, and generates various reports for the associated banks, merchants, membership clubs, etc.

In accordance with the present invention, the system, method, and computer program product for assisting a user in one or more activities during online shopping have numerous advantages. The method and system enable the user to get the right promotion at the right time based on the user's context online. This saves time and ensures that the user gets the most-suitable promotions on the basis of his/her preferences. Further, the system constantly tracks various personal details associated with the user's affiliations, and updates the server at regular time intervals. Furthermore, the system displays various promotions in multiple user-friendly formats, facilitating easy access to the promotions. Also, the system analyzes the responses provided by the user corresponding to the promotions, thereby helping the merchants, banks, etc., receive feedback on their promotions.

The system for assisting a user in one or more activities during online shopping, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit, and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, flash memory and the like. The storage device can also be other similar means for loading computer programs or other instructions into the computer system. The computer system also includes a communication unit, which enables the computer to connect to other databases and the Internet through an Input/Output (I/O) interface. The communication unit also enables the transfer as well as reception of data from other databases. The communication unit may include a modem, an Ethernet card, or any similar device which enable the computer system to connect to databases and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for assisting a user in one or more activities during online shopping. The computer program product includes a non transitory computer usable medium having a set program instructions comprising a program code for searching one or more documents in Local Area Network (LAN). The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for assisting a user in one or more activities during online shopping, the method comprising the steps of:
tracking at least one activity of the user, the at least one activity being one of the one or more activities performed in a browser, the at least one activity being tracked based on a context of the browser, the at least one activity being tracked by a first server, the user being registered with the first server;
interacting with one or more second servers at a pre-defined interval of time to retrieve information regarding one or more promotions;
storing one or more personal details, one or more rules defined by the user, one or more shopping details, and the one or more promotions in the first server;
targeting at least one promotion based on at least one of the context of the browser, the one or more personal details of the user, the one or more rules defined by the user, and the one or more shopping details, the at least one promotion being associated with the at least one activity;
presenting the at least one promotion having one or more attributes to the user in the browser, the one or more attributes including a payment card to be used with respect to the at least one promotion, the presenting of the at least one promotion is based on the one or more rules defined by the user and assists the user in the at least one activity; and
sending an analysis of a response of the user corresponding to the at least one promotion to the one or more second servers, wherein the analysis is sent in the form of one or more reports.

2. The method according to claim 1, wherein at least one of the one or more personal details is stored at a data processing unit of the user.

3. The method according to claim 1, wherein the at least one activity is at least one of searching for at least one of a product and a service, browsing details and reviews of at least one of a product and a service on a website, and paying for at least one of a product and a service.

4. The method according to claim 1, wherein the at least one promotion is presented based on at least one search result of a list of search results, at least one of the one or more personal details, and at least one of the one or more shopping details.

5. The method according to claim 1, wherein the at least one promotion is presented in at least one portion of the browser, wherein the browser includes a browser application for tracking the at least one activity of the user, the browser application interacting with the first server.

6. The method according to claim 5, wherein the at least one portion is a tag, a message panel, a curtain in the browser, a dropdown list of the browser, a dialogue box in the browser, a tool bar in the browser, a sidebar in the browser, and an available space in the browser.

7. The method according to claim 1, wherein the user is authenticated with the first server.

8. The method according to claim 1, further comprising storing the response of the user corresponding to the at least one promotion in the first server.

9. The method according to claim 1, wherein the context of the browser is at least one of a website Uniform Resource Locator (URL), a website, content of a web page, results of a search query, configuration of the browser, and configuration of a data processing unit facilitating online shopping.

10. The method according to claim 1, wherein at least one of the one or more personal details is at least one of a web browsing history of the user, affiliations of the user with one or more organizations, affiliations of the user with one or more memberships, affiliations of the user with one or more merchants, affiliations of the user with one or more banks, one or more personal credentials, and one or more personal preferences.

11. The method according to claim 1, wherein at least one of the one or more shopping details is at least one of demographic information, one or more product reviews, one or more merchant reviews, and one or more affinity group associations.

12. The method according to claim 1, wherein at least one of the one or more personal details, at least one of the one or more shopping details, and the at least one promotion are updated after a pre-defined interval of time, the at least one promotion being associated with one or more banks, one or more merchants, one or more memberships, and one or more organizations.

13. The method according to claim 12, wherein the at least one personal detail, the at least one shopping detail and the at least one promotion corresponding to the user are also updated.

14. The method according to claim 12, wherein at least one of the at least one personal detail, the at least one shopping detail, and the at least one promotion are updated by the first server.

15. The method according to claim 1 further comprising storing one or more transaction reports associated with the at least one activity.

16. The method according to claim 1, wherein the one or more second servers are associated with at least one of one or more banks, one or more merchants, one or more memberships, and one or more organizations.

17. The method according to claim 1 further comprising tracking at least one mode of payment used by the user, wherein the at least one promotion is selected based on the at least one mode of payment.

18. The method according to claim 1, wherein presenting the at least one promotion to the user in at least one pre-defined format, the at least one pre-defined format further comprising: tagging a search result, highlighting the at least one promotion with a border, and indicating the at least one promotion with an icon.

19. A first server for assisting a user in one or more activities during online shopping, the first server comprising a processor configured to execute a set of instructions, the first server comprising:
- a tracking module configured for interacting with a browser application embedded in a browser for tracking at least one activity of the user, the at least one activity being one of the one or more activities performed in the browser, the at least one activity being tracked based on a context of the browser;
- an interaction module configured for interacting with one or more second servers at pre-defined intervals of time to retrieve information regarding one or more promotions;
- a targeting module configured for targeting at least one promotion based on at least one of the context of the browser, one or more personal details of the user, one or more rules defined by the user, and one or more shopping details, the at least one promotion being associated with the at least one activity, wherein the one or more personal details, the one or more rules defined by the user, and the one or more shopping details, the at least one promotion are stored in a database of the first server; and
- a presentation module configured for presenting the at least one promotion having one or more attributes to the user in the browser, the one or more attributes including a payment card to be used with respect to the at least one promotion, the presenting of the at least one promotion is based on the one or more rules defined by the user and assists the user in the at least one activity; and
- an analysis module configured for sending an analysis of a response of the user corresponding to the at least one promotion to one or more second servers, wherein the analysis is sent in the form of one or more reports.

20. The first server according to claim 19, wherein the at least one activity is at least one of searching for at least one of a product and a service, browsing at least one of a product and a service on a website, and paying for at least one of a product and a service.

21. The first server according to claim 20 further comprising a sorting module for selecting a promotion based on at least one search result of a list of search results, at least one personal detail of the one or more personal details, and at least one shopping details of the one or more shopping details.

22. The first server according to claim 19, wherein the presentation module is further configured for presenting the at least one promotion in at least one portion of the browser, the at least one portion being a curtain in the browser, a dropdown list of the browser, a dialogue box in the browser, a sidebar in the browser, a toolbar in the browser, and an available space in the browser.

23. The first server according to claim 19 further comprising an authentication module configured for authenticating the user with the first server.

24. The first server according to claim 19, wherein the context of the browser is at least one of a website Uniform Resource Locator (URL), a website, content of a website, a search query, configuration of the browser, and configuration of a data processing unit facilitating the online shopping.

25. The first server according to claim 19, wherein at least one of the one or more personal details is at least one of web browsing history of the user, affiliations of the user with one or more organizations, affiliations of the user with one or more memberships, affiliations of the user with one or more merchants, affiliations of the user with one or more banks, one or more personal credentials, and one or more personal preferences.

26. The first server according to claim 19, wherein at least one of the one or more shopping details is at least one of demographic information, one or more product reviews, one or more merchant reviews, and one or more affinity group associations.

27. The first server according to claim 19 further comprising an updating module configured for updating the first server with at least one the one or more personal details, at least one of the one or more shopping details after a pre-defined interval of time.

28. The first server according to claim 27, wherein the updating module updates the at least one personal detail, the at least one shopping detail and the at least one promotion corresponding to the user.

29. The first server according to claim 27, wherein the updating module is further configured to interact with one or more second servers to update at least one of the at least one personal detail, the at least one shopping detail, and the at least one promotion.

30. The first server according to claim 19 further comprising means for storing one or more transaction reports associated with the at least one activity.

31. The first server according to claim 19, wherein one or more second servers are associated with at least one of one or more banks, one or more merchants, one or more memberships, and one or more organizations associated with the user.

32. The first server according to claim 19, wherein the tracking module facilitates an interaction between the browser application and the first server, the browser application being embedded in the browser.

33. The first server according to claim 19, wherein the tracking module further tracks at least one mode of payment used by the user, wherein the at least one promotion is selected based on the at least one mode of payment.

34. A computer program product executed by a computer, the computer program product comprising a non transitory computer usable medium having a computer readable program code embodied therein for assisting a user in one or more activities during online shopping, the computer readable program code performing:

tracking at least one activity of the user, the at least one activity being one of the one or more activities performed in a browser, the at least one activity being tracked based on a context of the browser, the at least one activity being tracked by a first server, the user being registered with the first server;

interacting with one or more second servers at a pre-defined interval of time to retrieve information regarding one or more promotions;

storing one or more personal details, one or more rules defined by the user, one or more shopping details, and the one or more promotions in the first server;

targeting at least one promotion based on at least one of the context of the browser, the one or more personal details of the user, the one or more rules defined by the user and the one or more shopping details, the at least one promotion being associated with the at least one activity;

presenting the at least one promotion having one or more attributes to the user in the browser, the one or more attributes including a payment card to be used with respect to the at least one promotion, the presenting of the at least one promotion is based on the one or more rules defined by the user and assists the user in the at least one activity; and sending an analysis of a response of the user corresponding to the at least one promotion to the one or more second servers, wherein the analysis is sent in the form of one or more reports.

35. The computer program code according to claim 34, wherein the at least one activity is at least one of searching for at least one of a product and a service, browsing at least one of a product and a service on a website, and paying for at least one of a product and a service.

36. The computer program code according to claim 35, wherein the at least one promotion is presented based on at least one search result of a list of search results, at least one the one or more personal details, and at least one of the one or more shopping details.

37. The computer program code according to claim 34, wherein the at least one promotion is presented in at least one portion of the browser.

38. The computer program code according to claim 34, wherein the user is authenticated with the first server.

39. The computer program code according to claim 34, wherein the at least one of the one or more personal details, the at least one of the one or more shopping details, and the at least one promotion are updated after a pre-defined interval of time, the at least one promotion being associated with at least one of one or more banks, one or more merchants, one or more memberships, and one or more organizations.

40. The computer program code according to claim 39, wherein at least one of the at least one personal detail, the at least one shopping detail, and the at least one promotion are updated by the first server.

41. The computer program code according to claim 34 further performing storing one or more transaction reports associated with the at least one activity.

42. The computer program code according to claim 34, wherein the one or more second servers are associated with at least one of one or more banks, one or more merchants, one or more memberships, and one or more organizations associated with the user.

43. The computer program code according to claim 34 further interacting with a browser application embedded in the browser.

44. The computer program code according to claim 34 further performing tracking at least one mode of payment used by the user, wherein the at least one promotion is selected based on the at least one mode of payment.

* * * * *